United States Patent [19]

Segal

[11] 3,973,862
[45] Aug. 10, 1976

[54] PILOT DRILL LOCATING MEANS FOR HOLE SAW ASSEMBLY

[76] Inventor: Fred Segal, 545 Fairhill Drive, Akron, Ohio 44313

[22] Filed: June 2, 1975

[21] Appl. No.: 583,203

[52] U.S. Cl. ................................ 408/204; 144/23; 408/703
[51] Int. Cl.² ...................................... B23B 51/04
[58] Field of Search ........... 408/204, 208, 209, 226, 408/239, 703; 279/9 R; 144/23

[56] References Cited
UNITED STATES PATENTS
3,880,546 4/1975 Segal..................................... 408/204
FOREIGN PATENTS OR APPLICATIONS
1,309,742 10/1962 France................................. 408/226

*Primary Examiner*—Othell M. Simpson
*Assistant Examiner*—Z. R. Bilinsky

[57] ABSTRACT

An improved means for locating the pilot drill of a hole saw assembly is disclosed. The assembly generally includes an arbor, which has a body and a spindle projecting from one end thereof, and a cup-shaped hole saw, with the arbor and the hole saw carrying cooperating cam and spring-loaded locking and driving means to draw one planar face of the arbor into secure flush engagement with the planar face of the base of the cup-shaped cutting member or hole saw itself. The forward face of the arbor has a recess therein, and one end of the pilot drill has a locating sleeve dimensioned so as to fit into the recess in the face of the arbor so that when the locking and driving means are utilized to draw the face of the arbor into flush contact with the face of the hole saw, the sleeve is trapped between the two faces, and the pilot drill is firmly located.

3 Claims, 10 Drawing Figures

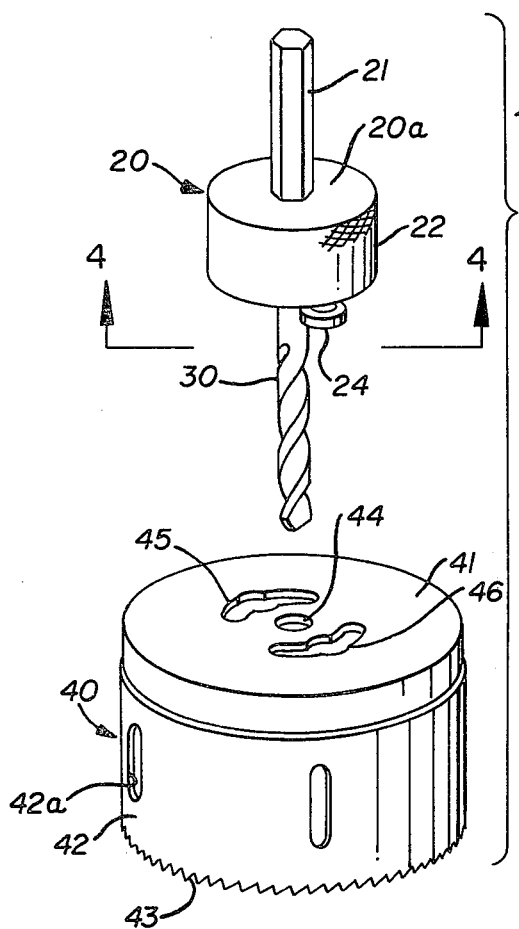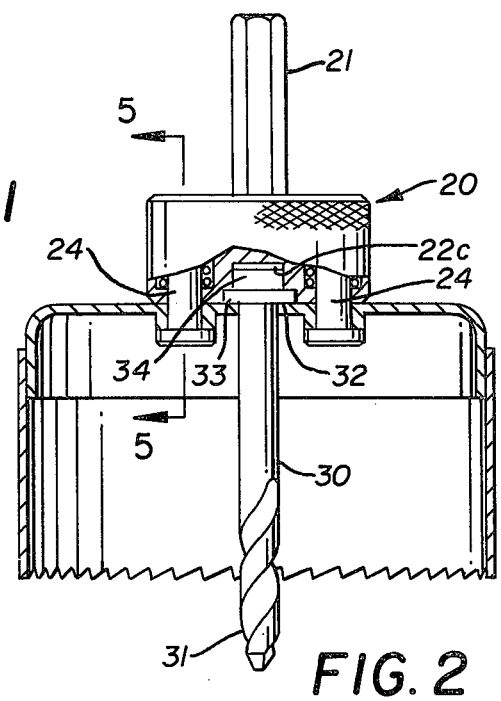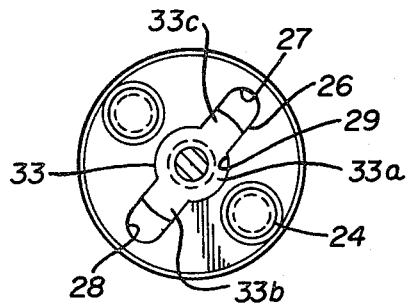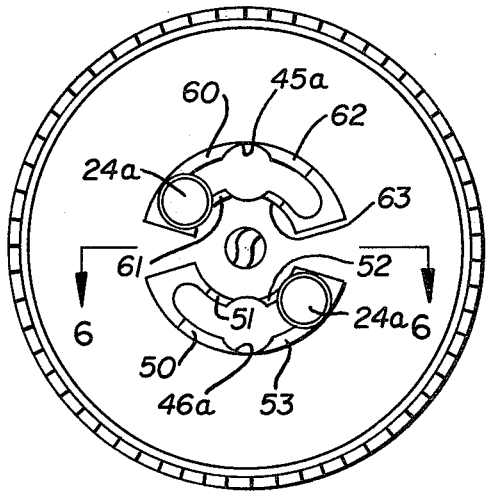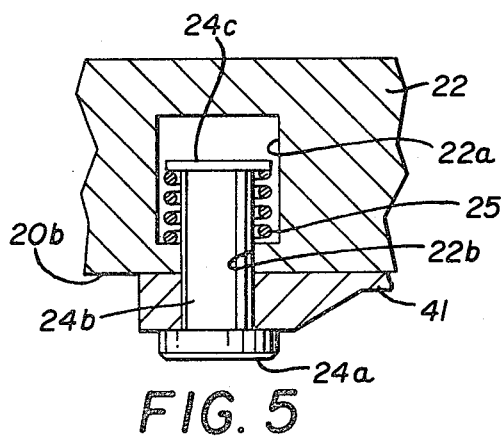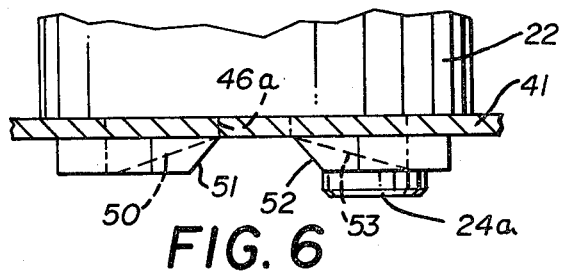

PILOT DRILL LOCATING MEANS FOR HOLE SAW ASSEMBLY

BACKGROUND OF THE INVENTION

This invention, in general, relates to hole saws and, in particular, relates to an improved means for locating the pilot drill thereof between the face of the arbor and the face of the hole saw itself.

DESCRIPTION OF THE PRIOR ART

The following prior art patents are known to Applicant:

| | |
|---|---|
| Blanch et al | U.S. Pat. No. 1,645,736 |
| Sandberg et al | U.S. Pat. No. 2,564,451 |
| Spiller | U.S. Pat. No. 2,626,667 |
| McKiff | U.S. Pat. No. 2,779,361 |
| Mueller et al | U.S. Pat. No. 2,852,967 |
| Stewart | U.S. Pat. No. 3,138,183 |
| Enders | U.S. Pat. No. 3,267,975 |
| Trevathan | U.S. Pat. No. 3,390,596 |
| Morse | U.S. Pat. No. 3,647,310 |
| Meshulam | U.S. Pat. No. 3,758,221 |
| Bittern | U.S. Pat. No. 3,784,316 |
| Segal | U.S. Pat. No. 3,880,546 |

The above-noted prior art patents disclose a variety of hole saw assemblies and means for interconnecting the driving arbor, which is itself received in a drill chuck, with the cup-shaped cutting member or hole saw itself. Generally these assemblies include pilot drills which are normally secured to the arbor by providing the arbor and its spindle with a through aperture so that the shank of the pilot drill can be received therein. A radially directed threaded aperture is then normally provided in the body of the arbor to receive a set screw which bears against the side of the pilot drill to hold the same in place.

There are a number of disadvantages to this prior art construction in general primarily with regard to the relatively complex and expensive manner of attachment between the arbor and the cup-shaped cutting member, and many of these disadvantages are believed to have been overcome by Applicant's earlier U.S. Pat. No. 3,880,546 for "Hole Saw Assembly". That patent disclosed a method of snap-locking the two members together so as to insure flush engagement between the arbor and the base of the hole saw.

All of the prior art including Segal U.S. Pat. No. 3,880,546, however, presents some disadvantages with regard to locating and securing of the pilot drill itself.

First, it is necessary to provide a through central bore in the body of the arbor and the spindle which projects therefrom.

Second, it is necessary to provide a radially opening threaded aperture in the body of the arbor so that a set screw may be inserted therein and brought to bear against the shank of the drill.

Third, it is necessary to machine a "flat" on the periphery of the drill shank so that the set screw aforementioned can engage it and hold it in place.

All of these features require extra machining operations which are eliminated by Applicant's present invention, and the provision of the through bore in the spindle of the arbor also requires that the spindle be of a certain minimum diameter, thereby limiting the range of drills which can be used.

SUMMARY OF THE INVENTION

It has been discovered that the disadvantages above-noted with regard to locating and securing the pilot drill can be eliminated and the overall assembly simplified with a consequent saving of manufacturing cost.

Thus it has been discovered that by providing a hole saw of the general type described in Segal U.S. Pat. No. 3,880,546 in which spring-loaded locking and driving means are utilized to bring the forward face of the arbor into flush engagement with the base of the hole saw, and by providing the pilot drill with a sleeve on one end and also providing the arbor with a complementally shaped and dimensioned recess in its forward face, upon locking of the arbor and the hole saw together, the pilot drill will be trapped therebetween, thereby securing it and locating it.

In this fashion it has been discovered that the necessity of boring a through hole in the spindle of the arbor can be eliminated, and therefore smaller diameter spindles can be utilized than has heretofore been the case. In this fashion the cost of the machining operation is saved, and additionally the smaller spindles made possible by this kind of construction enable the hole saw to be used with a wider range of drill sizes.

By this type of connection and location for the drill, it is also possible to eliminate the necessity for tapping and threading the radial bore for reception of the set screw and also, of course, eliminating the set screw.

Furthermore, this type of construction eliminates the need to machine a flat surface on the shank of the hole saw so that the set screw can bear against it.

Accordingly, production of an improved pilot drill locating means becomes the principal object of this invention, with other objects thereof becoming more apparent upon a reading of the following brief specification, considered and interpreted in view of the accompanying drawings.

OF THE DRAWINGS

FIG. 1 is an exploded perspective view of the improved hole saw assembly.

FIG. 2 is an elevational view partially broken away and in section.

FIG. 3 is a top plan view of the assembled apparatus.

FIG. 4 is a top plan view of the arbor and pilot drill in their assembled condition.

FIG. 5 is a sectional view taken along the line 5—5 of FIG. 2 showing the spring-loaded stud arrangement.

FIG. 6 is a sectional view taken along the line 6—6 of FIG. 3 showing the ramp structure for facilitating interconnection of the arbor and the cup-shaped cutting member.

BRIEF DESCRIPTION OF THE PREFERRED EMBODIMENTS

Figure 7:
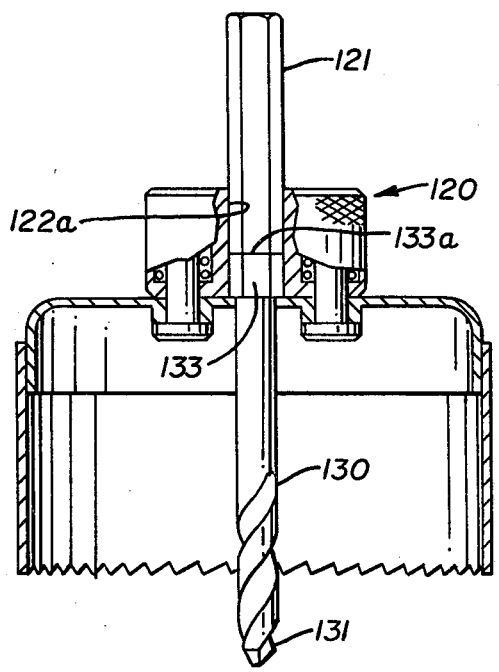
FIG. 7 is an elevational view similar to FIG. 2 showing a modified form of the invention.

Referring first then to FIG. 1, it will be noted that the overall hole saw assembly, generally indicated by the numeral 10, consists primarily of three components, namely, the arbor 20, the pilot drill 30, and the cup-shaped cutting member or hole saw 40.

The arbor 20 has a spindle 21 which is solid, as noted above, and therefore capable of being produced in much smaller diameters that is the case with the conventional hollow-type spindles.

The spindle 21 projects from the first face 20a of the arbor body 22, and the second face 20b carries a pair of opposed T-shaped studs 24,24.

FIG. 5 shows the detailed assembly of one of the studs 24, with it being understood that the remaining stud 24 has an identical construction. In this regard the body 22 of the arbor 20 has a bore and counterbore 22a,22b therein. A spring 26 is received within the bore 22a in encircling relationship to the shank 24b of the stud 24. The stud has an enlarged head 24c so that the spring is trapped between that head and the shoulder formed by the juncture of bore 22a and counterbore 22b. A cap 24a is received on the other end of the shank 24b of stud 24, and in this fashion the stud 24 is securely held on the body 22 of the arbor and is normally urged toward the forward face 20b thereof. This type of construction is repeated with regard to the opposed stud 24 so that they are identical in construction. Furthermore, this type of stud construction is fully described in Applicant's earlier patent, U.S. Pat. No. 3,880,546.

The saw 40, as illustrated in FIG. 1, is a generally cylindrical cup-shaped member having a base 41, an elongate cylindrical body 42, and cutting teeth 43 disposed on the forward edge thereof. The side walls of the body 42 have appropriate chip-relieving apertures 42a,42a provided therein in conventional fashion.

The base 41 of the hole saw 40 is best illustrated in FIGS. 1 and 3, and in this regard it will be noted that a central aperture 44 is provided for reception of the shank of the pilot drill 30 as will be subsequently described. The base 41 of the saw contains a pair of opposed arcuate slots 45 and 46, with the slots both having an enlarged central area 45a,46a of sufficient size to receive the heads 24a,24a of the studs 24,24.

On both sides of the enlarged openings 45a,46a are reduced-width arcuate slots having a width smaller than the diameter of the stud heads but being of sufficient size to freely receive the shanks thereof.

Referring to FIGS. 3 and 5, it will be noted that running along the edges of the slots 45b,45c and 46b,46c are inclined ramps serving as cam ways. In the case of the slot 45, these ramps are identified by the numerals 60, 61, 62, and 63; and in the case of the slot 46, they are identified by the numerals 50, 51, 52, and 53.

Again, this structure is fully disclosed in Segal U.S. Pat. No. 3,880,546, and briefly, in assembly and use it is merely necessary to insert the heads of the studs 24,24 into the enlarged openings 45,46, following which by twisting motion in either direction the heads will ride up the cam surfaces 60,61, 52,53, or 62,63 and 51,50 against the force of the springs, thereby drawing the second face 20b of the arbor into flush interconnection with the rearwardly presented face of the saw base 41.

In the present invention the forwardly presented face of the arbor 20 contains a recess 26 which has an enlarged central area 29 and radially radiating areas 27 and 28. A further blind counterbore 22c is provided in the arbor 20 in communication with the enlarged central area 29 of recess 26.

Figure 9:
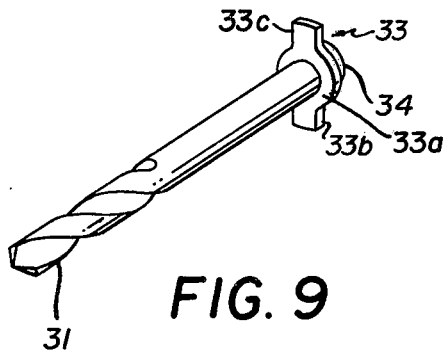
FIG. 9 is a perspective view of the improved pilot drill illustrated in FIGS. 1 through 6.

Referring to FIGS. 2, 4, and 9 of the drawings, it will be noted that the pilot drill 30 consists of an elongate shank having a cutting tip 31 on one end and a sleeve 33 on the other.

The sleeve 33 includes a base portion 34 of suitable diameter to be received within the blind counterbore 22c of the arbor 20 and an enlarged integral flange extending from opposed sides thereof. This flange has an enlarged central portion 33a and projecting wing portions 33b and 33c, with the thickness of the flange approximating the depth of the recess wings 27 and 28 so that the tip of the flange will be approximately coextensive with the face 20b of the arbor.

Accordingly, in assembly the projecting base portion 34 of the sleeve is received within the blind counterbore 22c of the arbor, while the enlarged portion 33a of the flange is received in the enlarged portion 29 of the recess 26, and the wings 33b and 33c are received in the radially projecting recesses 27 and 28. The recesses are dimensioned so that the sleeve is securely received therein, and the depth of the principal recesses 27, 28, and 29 is such that when the pilot drill 30 is in place on the arbor, the top surface of the flanges will be coextensive with the front face of the arbor as previously noted.

Following this, once the hole saw 40 is slipped over studs 24,24, with the drill 30 passing through aperture 44, and is snapped into place on arbor 20 as described above, the pilot drill 30 will be trapped between the second face of the arbor and the rear face of the pilot drill.

In this fashion the pilot drill 30 will be securely located and firmly held in place without the necessity for providing the flat surface on its shank; providing a hollow spindle on the arbor; and providing a set screw and a corresponding threaded bore in the body of the arbor for reception of the set screw.

Furthermore, not only will the pilot drill be firmly secured and located without the need of the costly machining operations attendant to providing the above-noted bores and threading, but location and securing of the pilot drill will be accomplished much faster than with conventional means wherein the shank of the drill must be located within the arbor to the desired depth and then locked in place by means of the set screw.

Figure 8:
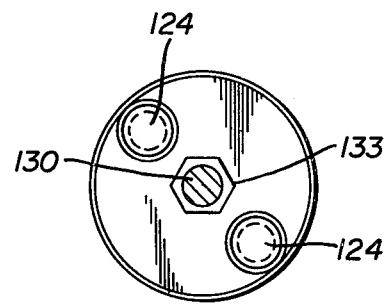
FIG. 8 is a top plan view of the arbor and pilot drill in their assembled condition similar to FIG. 4 and showing the modified form of the invention.
Figure 10:
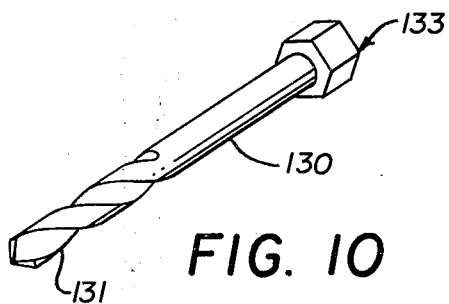
FIG. 10 is a perspective view of the improved pilot drill of the modification of FIGS. 7 and 8.

With regard to FIGS. 7, 8, and 10 of the drawings, a modified form of the invention is shown wherein the arbor 120 has a hexagonal through bore 122a provided therein. The spindle 121, which is normally hexagonal in configuration, is pressed into one end of the bore 122a. The pilot drill 130 is similar in that it has an elongate shank with a cutting end 131, but the opposed end of the shank carries a modified sleeve 113 which is also hexagonal in shape. This is intended to be received in the opposed end of the bore 122a and has a length dimension sufficient so that when the spindle is in place and the pilot drill 130 is dropped into place in the remaining area of the bore 122a, the same will be flush with or slightly below the face of the arbor. In this fashion when the saw is engaged with the arbor as described above with regard to FIGS. 1 through 6 of the drawings, the drill again will be trapped in place firmly located; and the hexagonal configuration will prevent inadvertent rotation of the drill, while the engagement between the face of the saw and the face of the arbor will prevent longitudinal disengagement and also provide a firm locking arrangement to avoid chattering or other problems normally encountered in operation of hole saws.

While a full and complete description of the invention has been set forth in accordance with the dictates of the Patent Statutes, it should be understood that modification may be resorted to without departing from the spirit hereof or the scope of the appended claims.

Thus while the invention has been illustrated for use with a hole saw assembly such as shown in Segal U.S. Pat. No. 3,880,546, it is believed that the inventive principle disclosed herein would also have utility with other hole saw assemblies.

Also, while sleeve 33 has been illustrated and described as a separate piece which has been "sweated" onto the end of drill 30, it is believed apparent that it could also be formed integrally therewith.

What is claimed is:
1. A hole saw assembly comprising:
   A. an arbor having
      1. a body portion with opposed first and second faces, and
      2. a spindle projecting from said first face,
   B. a cylindrical cutting member having
      1. a base with a rearwardly presented planar face,
      2. a cylindrical body secured to said base, and
      3. cutting teeth on the forward edge of said body;
   C. locking and driving means carried by said arbor for engaging said base of said cutting member and drawing said base into flush contact with said second planar face of said arbor;
   D. a pilot drill having
      1. an elongate shank with first and second ends,
      2. a cutting tip disposed on said first end of said shank, and
      3. an axially and radially extending locating sleeve disposed on said second end of said shank;
   E. said second face of said arbor having a blind recess therein, with said recess having a configuration and depth dimension substantially complemental to the configuration and depth dimension of said locating sleeve;
   F. said base of said cutting member having a through aperture therein for reception of said shank of said pilot drill; and
   G. said locating sleeve being received in said recess in said second face of said arbor and being trapped between said second face of said arbor and said rearwardly presented face of said cutting member against axial and rotational movement with respect thereto upon actuation of said locking and driving means.

2. The assembly of claim 1 wherein
   A. said blind recess in said second face of said arbor includes
      1. a first blind bore, and
      2. radially extending recesses communicating with said blind bore; and
   B. said sleeve includes
      1. a base portion having a diameter approximating the diameter of said blind bore, and
      2. radially extending flanges having planar configurations complemental to the planar configuration of said radially extending recesses and height dimensions substantially equal to the depth dimensions of said radially extending recesses.

3. The assembly of claim 1 wherein
   A. said blind recess in said second face of said arbor includes
      1. a first blind bore,
      2. an enlarged central recess communicating with said blind bore, and
      3. radially extending recesses communicating with said central recess; and
   B. said sleeve includes
      1. a base portion having a diameter approximating the diameter of said blind bore,
      2. an enlarged central flange portion having a planar configuration complemental to the planar configuration of said enlarged recess, and
      3. radially extending flanges having planar configurations complemental to the planar configuration of said radially extending recesses and height dimensions substantially equal to the depth dimensions of said radially extending recesses.

* * * * *